(12) United States Patent
Christner et al.

(10) Patent No.: US 12,287,872 B2
(45) Date of Patent: Apr. 29, 2025

(54) SYSTEM AND METHOD FOR CORRELATING FILESYSTEM EVENTS INTO MEANINGFUL BEHAVIORS

(71) Applicant: EMC IP Holding Company LLC, Hopkinton, MA (US)

(72) Inventors: Joel Christner, El Dorado Hills, CA (US); Nicole Reineke, Northborough, MA (US); Farida Shafik, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 812 days.

(21) Appl. No.: 17/446,531

(22) Filed: Aug. 31, 2021

(65) Prior Publication Data
US 2023/0068691 A1 Mar. 2, 2023

(51) Int. Cl.
*G06F 21/00* (2013.01)
*G06F 9/54* (2006.01)
*G06F 16/23* (2019.01)
*G06F 21/55* (2013.01)

(52) U.S. Cl.
CPC ............ *G06F 21/554* (2013.01); *G06F 9/545* (2013.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 8,065,728 B2* | 11/2011 | Wang | ................... | G06F 21/554 726/22 |
| 8,086,585 B1* | 12/2011 | Brashers | ............... | G06F 16/137 707/705 |
| 9,275,065 B1* | 3/2016 | Ganesh | ................. | G06F 21/556 |
| 9,733,969 B2* | 8/2017 | Derbeko | ................ | G06F 21/53 |
| 9,760,445 B1* | 9/2017 | Chopra | ................. | G06F 3/0683 |
| 10,025,931 B1* | 7/2018 | Natanzon | ................ | G06F 21/78 |
| 11,281,772 B2* | 3/2022 | Tan | ........................ | G06F 21/554 |
| 11,449,963 B1* | 9/2022 | Beeler | .................. | H04L 67/025 |
| 11,611,586 B2* | 3/2023 | Strogov | .............. | H04L 63/1491 |
| 11,720,529 B2* | 8/2023 | Mason | ................. | G06F 16/1744 707/827 |
| 11,991,198 B1* | 5/2024 | Kapoor | ................. | H04L 63/102 |
| 2006/0123062 A1* | 6/2006 | Bobbitt | ................. | G06F 16/188 |
| 2008/0034419 A1* | 2/2008 | Mullick | ................ | H04L 63/102 726/15 |
| 2008/0282337 A1* | 11/2008 | Crawford | .............. | H04L 65/102 726/14 |
| 2008/0295174 A1* | 11/2008 | Fahmy | .................... | G06F 21/57 380/59 |
| 2015/0067763 A1* | 3/2015 | Dalcher | ................ | G06F 21/554 726/1 |
| 2017/0213031 A1* | 7/2017 | Diehl | ........................ | G06F 9/46 |
| 2018/0351968 A1* | 12/2018 | MacLeod | ............. | G06F 21/568 |
| 2019/0138723 A1* | 5/2019 | Diehl | .................. | H04L 63/1441 |

(Continued)

*Primary Examiner* — Jeffery L Williams
(74) *Attorney, Agent, or Firm* — Workman Nydegger

(57) ABSTRACT

One example method includes integrating user space applications with kernel space events including primitives. The events are intercepted in kernel space and processed in user space. The events can be stored in a session cache that allows a holistic view of behavior to be determined with regard to resources of the computing system. The events in the session cache can be correlated to user or process behavior by provided a time-based view of the events.

20 Claims, 7 Drawing Sheets

(56) References Cited

U.S. PATENT DOCUMENTS

| | | | |
|---|---|---|---|
| 2019/0205533 A1* | 7/2019 | Diehl | G06F 21/567 |
| 2019/0286821 A1* | 9/2019 | Strogov | G06F 21/568 |
| 2020/0143054 A1* | 5/2020 | Cohen | G06F 21/554 |
| 2020/0210580 A1* | 7/2020 | Strogov | G06N 20/20 |
| 2022/0374392 A1* | 11/2022 | Samy | H04L 67/1097 |
| 2023/0068691 A1* | 3/2023 | Christner | G06F 16/2358 |
| 2023/0401171 A1* | 12/2023 | Christner | G06F 16/148 |

* cited by examiner

SYSTEM AND METHOD FOR CORRELATING FILESYSTEM EVENTS INTO MEANINGFUL BEHAVIORS

FIELD OF THE INVENTION

Embodiments of the present invention generally relate to correlating filesystem events. More particularly, at least some embodiments of the invention relate to systems, hardware, software, computer-readable media, and methods for correlating filesystem events with behaviors.

BACKGROUND

REST (Representational State Transfer) is a style or architecture for application programming interfaces (APIs) that is often used by online browsers, cloud applications, and the like. RESTful APIs should comply with various constraints. For example, the RESTful architecture typically separates the user interface from storage. This advantageously improves the portability and scalability across platforms.

RESTful APIs are also stateless. A stateless call is a call that includes all of the information needed to understand the request. For example, a call may provide context such as identity and authentication. Each call in a RESTful platform is essentially independent and can be directly correlated to user behavior.

In contrast, file system events primitives may or may not be independent and do not provide full contextual information. Further, filesystem primitives may not be directly correlated to user behavior.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to correlating file system events behaviors. More particularly, at least some embodiments of the invention relate to systems, hardware, software, computer-readable media, and methods are configured to evaluate file system events in order to discern how a user or process is behaving with respect to the file system or with respect to specific files.

File system events, as used herein, may include, but are not limited to file system IO (Input/Output), file system primitives, file system calls, or the like. For example, accessing a disk, at a fundamental level, may involve primitives such as seek to a location or position, read from a location or position, or write to a location or position. Thus, reference to events may include primitives.

Embodiments of the invention may monitor file system events (e.g., primitives), analyze or process these events to identify relevant contextual information and correlate these events to meaningful actions or behaviors. For example, the file system events may be analyzed to discern user behavior, system events (e.g., attack detection, permission or security enforcement). The correlated events can be processed to generate a logical timeline, which may take various forms, that can be stored in a database or other data store. For example, the file system events or logical timeline may be stored in the data store in graph form, in a time series form, or the like. Queries can be executed against the data store to gain visibility into the lineage of certain data or files (e.g., create, read, update, delete). This facilitates use cases such as security, compliance, governance, or the like. For example, the data store may allow certain behaviors to be identified (e.g., which users used files containing certain text or which users deleted certain documents that meet certain criteria).

More generally, embodiments of the invention correlate file system events related to a particular handle (e.g., an identifier often associated with an open file) with the holistic actions or behavior of a user (or users) or a process (or processes).

Figure 1:
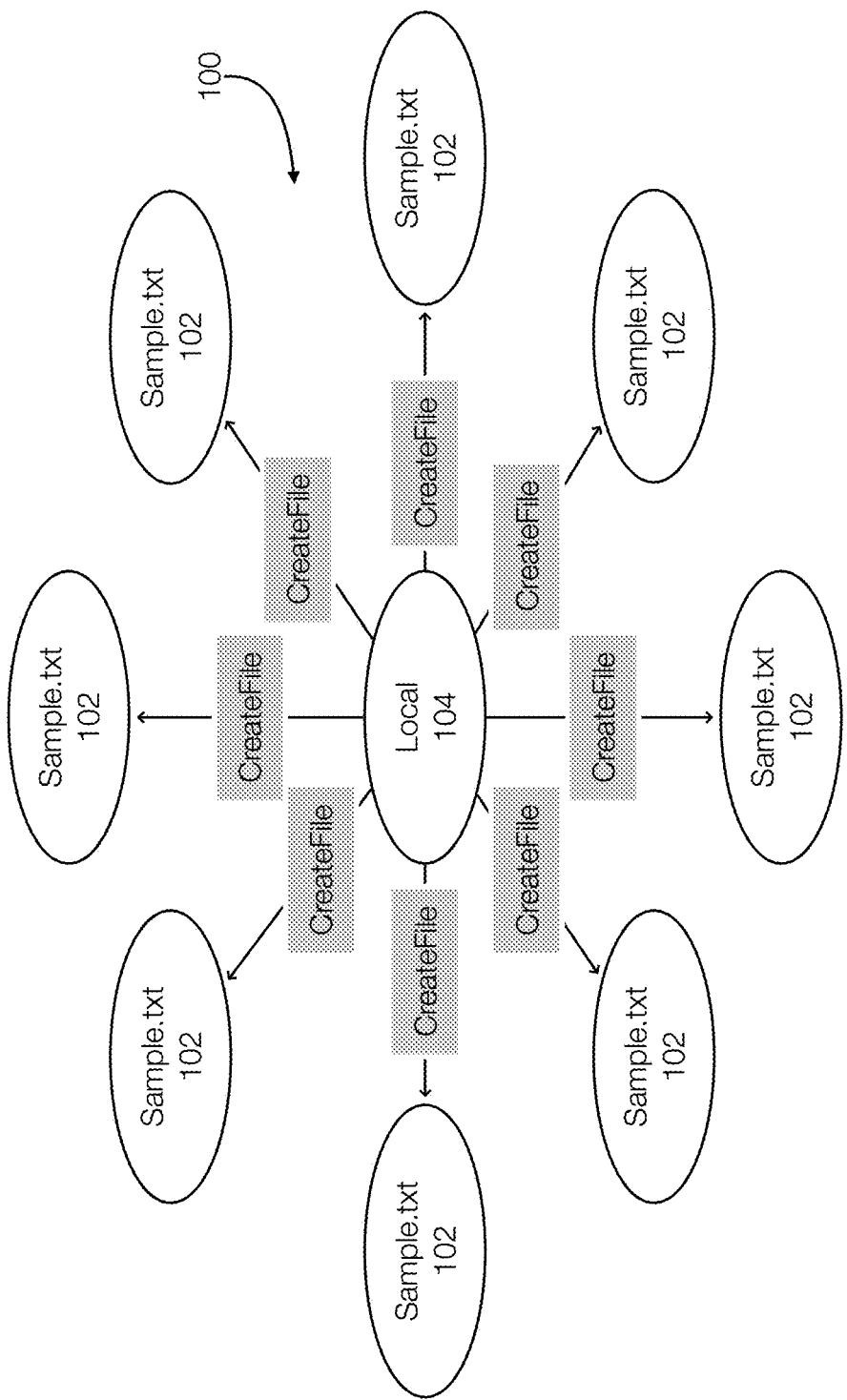
FIG. 1 discloses aspects of file system events in a local file system.

FIG. 1 discloses aspects of file system events in a local file system. FIG. 1 illustrates that multiple file system events, such as a createfile primitive, are performed in a local filesystem 104 to simply open a file 102 (e.g., sample.txt). The graph 100 demonstrates that, conventionally, understanding or comprehending the overall user or process behavior is difficult. Systemic, user, process, or environment wide phenomena, which may include user or process behavior, is not discernable from these events when the events are viewed individually. Embodiments of the invention address these concerns and correlate events, including primitives, with user behavior, process behavior, environment events, and/or other system phenomena.

Figure 2:
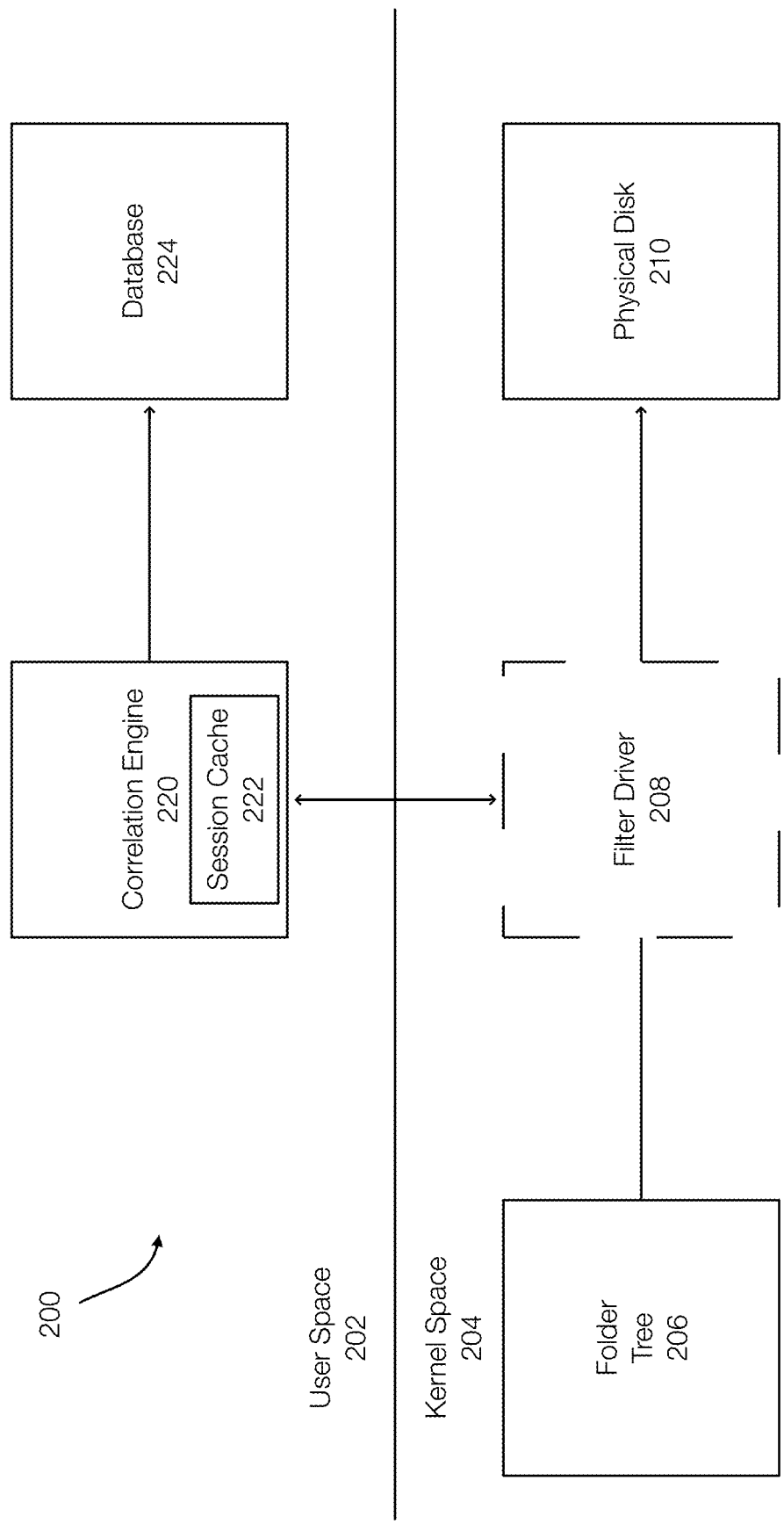
FIG. 2 discloses aspects of a correlation engine configured to correlate file system events with behavior in a computing system.

FIG. 2 illustrates an example of a computing system in which system events or primitives are correlated with user behavior, process behavior, or the like. The computing system 200 may include processor(s), memory of different types, networking hardware, storage devices, or the like and may be a single machine, multiple machines or the like. The computing system 200 may be implemented in physical machines, virtual machines, container platforms or the like.

In this example, the computing system 200 (or operating system thereof) includes a user space 202 and a kernel space 204. In the kernel space 204, file system events (e.g., primitives) may be performed with respect to a folder tree 206 (or other file system or file system implementation) and a physical disk 210. For example, creating a file in the folder tree 206 results in primitives that are directed to and performed at the physical disk 210. Other events such as opening, reading, writing and other actions performed in the folder tree 206 result in primitives that are performed at the physical disk 210.

Embodiments of the invention relate to a correlation engine 220 that is configured to correlate these events or more specifically these primitives with user behavior, process behavior, anomalous behavior, and/or other phenomena. The correlation engine 202 may be associated with or configured to interact with a filter driver 208. The filter driver 208 may be implemented in the kernel space 204 and may be configured to intercept the file system events, which includes primitives.

The intercepted primitives are provided to the correlation engine 220. The correlation engine 220 is configured to update a session cache 222 for each invocation of a file system primitive. Updating the session cache 222 by the correlation engine 220 may include extracting contextual information from each primitive such as user, process, resource, or the like. The contextual information is stored in the session cache 222. The session cache 222 may be configured such that the primitives can be associated with specific files or handles. Thus, each file or handle may be associated with a specific session and with specific metadata.

Thus, the correlation engine updates the session cache 222 with the extracted contextual information for each event. The correlation engine 220 may also include information from directory services such as Lightweight Directory Access Protocol LDAP), other external sources, local process information (PID, executable, location), or the like in the session cache. This information or data generated by the correlation engine 220 can be stored in a database 224. The data can also be processed into a logical timeline that can be stored in graph form, as time series data, or the like. The database 224 may be searchable.

More specifically, as IO events or primitives are intercepted and received by the correlation engine 220, the session cache 222 is updated by creating a new entry or updating an existing entry. In one example, data associated with the event may also be included in the session cache for various reasons including security purposes.

When a session for a file is created in the session cache, information from subsequent events related to that file are included in the same session. Certain events may indicate that a session has concluded. For example, a closefile primitive may cause the corresponding session to be finalized. Thus, all of the data collected or related to the session for a given file or other resource can be transmitted to an external source such as the database 224. This can provide a holistic or time based view of what happened to the file.

Figure 3:
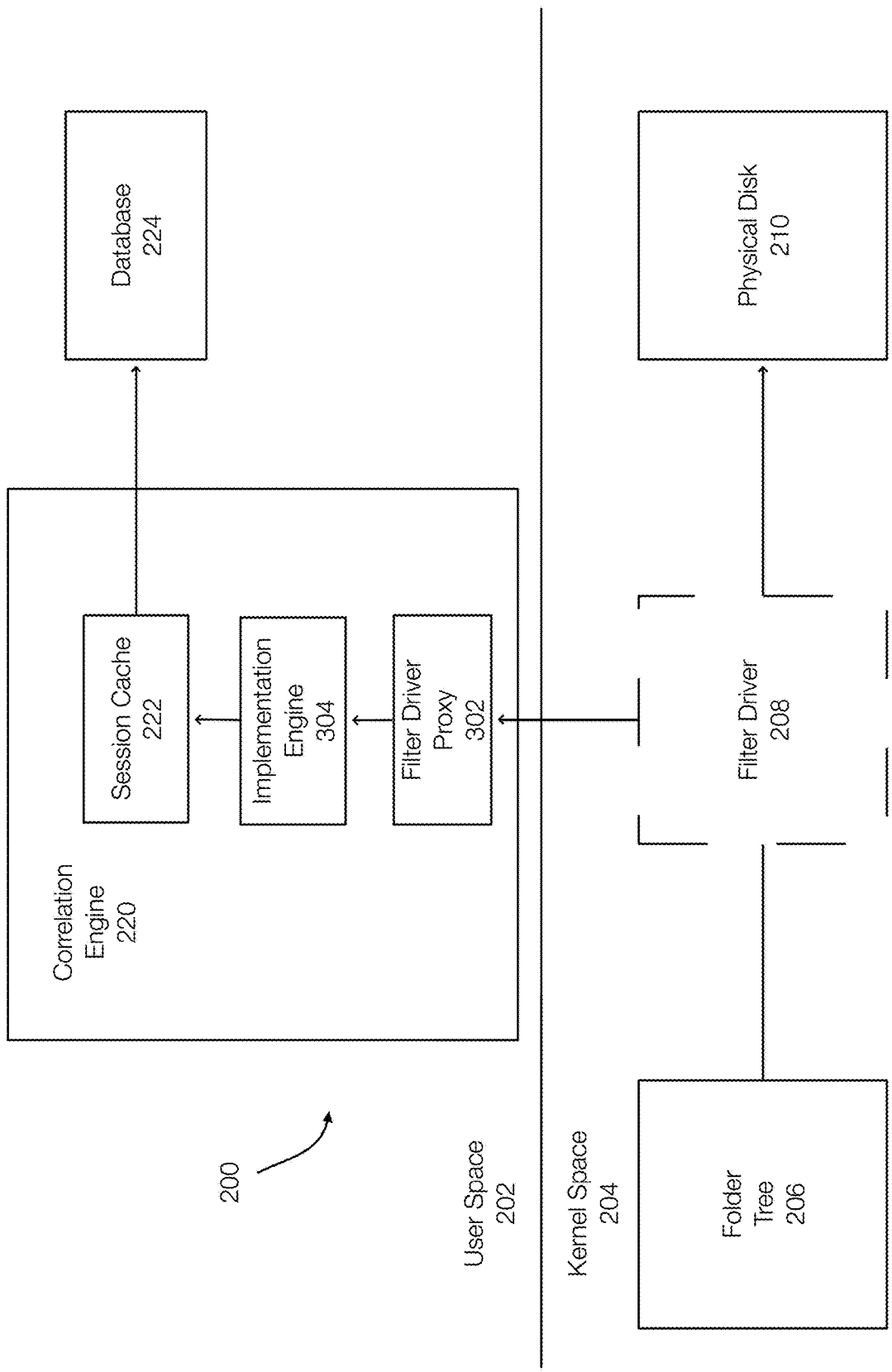
FIG. 3 discloses additional aspects of the correlation engine shown in FIG. 2.

FIG. 3 illustrates additional aspects of the computing system and of the correlation engine shown in FIG. 2. For example, the correlation engine 220 may include the session cache 222, an implementation engine 304, and a filter driver proxy 302. In this example, the filter driver proxy 302 may be executed in the user space 202 and is configured to interface with the filter driver 208, which is operating in the kernel space 204. An example filter driver 208 may include Filesystem in User Space (FUSE). The filter driver proxy 302 ensures that when a kernel-mode API is invoked, the kernel-mode API can be piped to the user space 202.

The implementation engine 304 handles the kernel-mode invocations piped to the user space 202. In one example, the implementation engine 304 may encapsulate and handle the kernel-mode API invocations. The implementation engine 304 may include, by way of example, a class library that allows the event to be processed and stored in the session cache 222.

The session cache 222 may include multiple sessions—one for each file or handle associated with the detected events. The session cache 222 may include, by way of example only, a dictionary or hash map using: (i) a unique session identifier as a key (includes the identity, the file handler, and/or other unique identifiers, (ii) a value associated with a dictionary containing a singleton representing an identity of a user (if any), process metadata including process ID, executable name, file location, application name, and the like, and (iii) a time-ordered list of primitives (e.g., IO events).

The session cache 222 may also include an API, SDK, software shim or other trigger that allows the local events stored in the session cache 222 to be externally readable.

Thus, as events are received via the filter driver proxy 302, the session cache is updated. An event associated with a file or handle not currently present in the session cache results in a new entry in the session cache 222. The new entry is thus associated with a session. Events associated with existing sessions are updated. Sessions (e.g., each file may be associated with a session in the session cache 222) can be created, updated, closed, exported, or the like. A session cache may include multiple sessions for the same file or handle. For example, a session for a file may close and another session may begin before the prior session is exported or processed. Typically, however, once a session is closed or at various times, eligible sessions (e.g., closed sessions) are exported to the database 224. More specifically, when a session has concluded, the entry from the session cache, metadata from raw IO events contained therein, and the like are processed to extract relevant metadata. This may be performed locally on the system storing the session cache or on another system, by invoking an API or trigger.

The processing performed when a session closes may include the following operations. If the user specified in the identity is local, user parameters including name and email address may be extracted. If the user specified in the identity is remote (e.g., stored on LDAP), the user information including name, email address, organizational unit, group membership, extended attributes, etc., is retrieved.

In addition, a logical timeline may be created from the session(s). The logical timeline may specify the time at which the file or resource was opened and the logical sequence of operations that occurred against the file. In addition, raw data may also be captured (this may include data read and data written) and included or referenced in the logical timeline.

When the session for a handle or file is finished and the logical timeline is created, objects, which may include multiple logical timelines, can be packaged and provided to a destination storage, such as a database in a datacenter or other storage. The destination storage may be a relational database, a graph database, the local filesystem, a bucket or container in an object storage repository.

Figure 4:
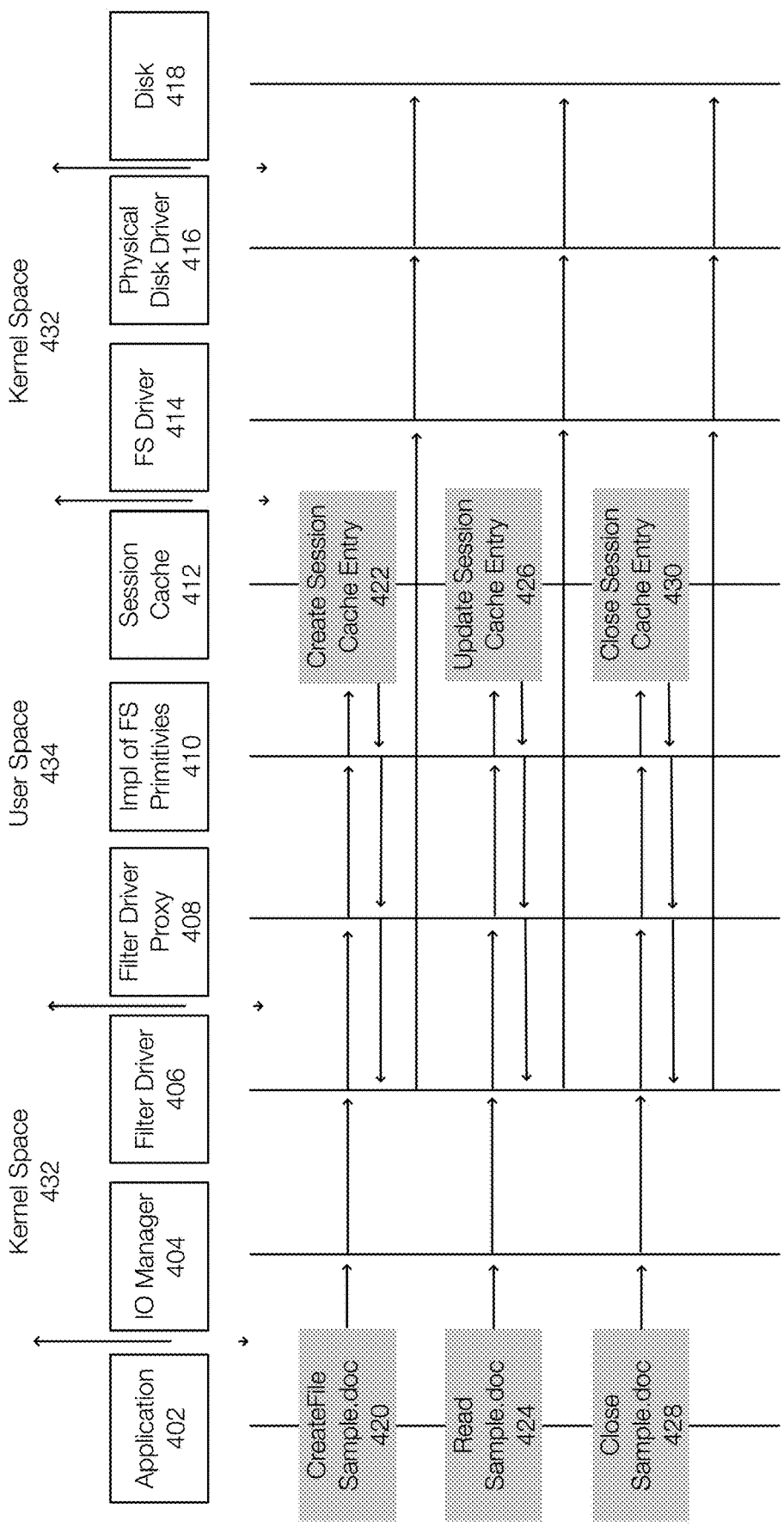
FIG. 4 discloses aspects of a flow diagram for correlating events in a file system.

FIG. 4 illustrates an example of file system events (e.g., primitives) that occur in a file system and the relationship of these events to a session in a session cache. FIG. 4 illustrates how a session relative to a specific file or handle (file sample .doc) is captured and stored. FIG. 4 also illustrates aspects of correlating file system events with behavior.

In FIG. 4, an application 402 may create a file sample.doc 420. This is associated with an IO event and a primitive such as createfile. This primitive passes to the IO manager 404 and is then intercepted by a filter driver 406 in kernel space 432. The intercepted primitive is then delivered, via the filter driver proxy 408 and the implementation engine (implementation of file system primitives 410) to the session cache 412.

Because a session for the file sample.doc does not exist in the session cache 412, a session cache entry 422 is created in this example.

An acknowledgment is then returned to the filter driver of the event is marshalled back to the filter driver 406 through the stack. The primitive is then delivered, by the filter driver 406 in the kernel space 432 to the file system driver 414. The primitive 414 passes through the physical disk driver 416 and is performed on the physical disk 418.

When the next event, which is a command to read 424 the sample.doc, occurs, a similar flow is performed. However, the corresponding session cache entry is updated 426 because the session for the file sample.doc was previously created. When the command to close 428 the file is intercepted by the filter driver 406 and delivered to the session cache 412, the session for the file in the session cache, which may include multiple entries (e.g., one for each primitive) is closed 430 (and updated as necessary).

Figure 5:
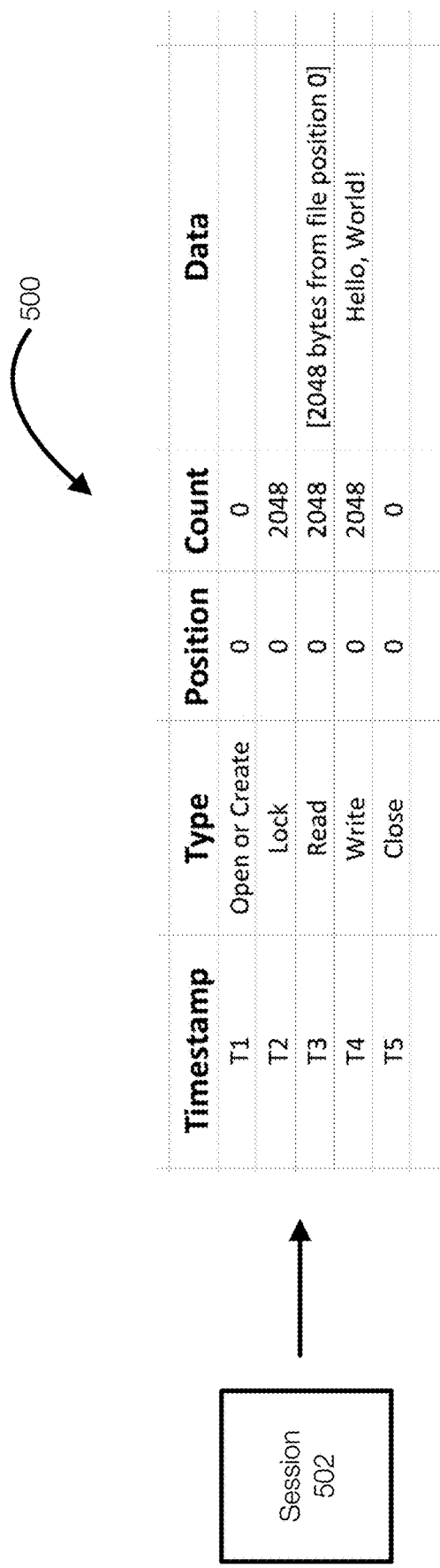
FIG. 5 discloses aspects of a logical timeline generated from events captured by the correlation engine of FIG. 2.

Next, the session (or multiple sessions) can be processed to generate the logical timeline(s). FIG. 5 illustrates an example of a logical timeline that may be generated from a session in a session cache. FIG. 5 thus illustrates a logical timeline 500 that includes information for each of the entries in the corresponding session 502. In this example, the session 502 is processed such that the logical timeline conveys a sense of the behavior of the user or process. In this example, it is clear that a specific application created a file and wrote "Hello, World!" to that file as text. The file was then closed. As discussed with respect to FIG. 1, the identification of multiple primitives that were issued to simply create a file does not provide a holistic view of what happened to the file and this understanding or behavior cannot be gained from the primitives individually.

Processing the information in the session 502 allows the file system events to be presented in a more understandable way and from the perspective of a session, which may cover multiple events. In this case, the file was opened or created, the space on the disk was locked and read. Then, text was written to the reserved space and the filed was closed. The logical timeline 500 may also include other information such as user information, attributes, or the like as previously described. The logical timeline 500 can be packaged and stored in persistent storage.

Advantageously, a unified view of the lifecycle of a file, object, contents of a directory tree, contents of a bucket, or the like can be tracked for the entire lifecycle. This unified view of the entire lifecycle is important for governance, compliance, provenance, chain of custody, and the like.

Persisting metadata of this kind in a repository that can be queried (relational database, graph database, time series database) enables queries that yield insight into how data is used. For example, queries such as who created a file, who read the file, who wrote to the file, who deleted the file, who read any file containing a specific keyword, who wrote a specific pattern to any file, or the like can be determined.

Embodiments of the invention also allow for novel security mechanisms. Data can be inspected using content inspection techniques prior to allowing a write to be serviced or prior to allowing a read to be returned to a user. Policies can be generated to determine what type of data a user can see, access, use, write, delete, or the like. For example, each time an entry is created in the session cache, the entry (as well as other information for the session) can be accessed and the policies can be applied to the event. Because the event has been detected prior to completion, the event can be allowed, altered, prevented, or the like. Further, this allows notifications to be generated. This can protect data from unauthorized users, prevent malware infections, or the like.

The correlation engine may also be configured to generate triggers based on the increased visibility into the file system provided by embodiments of the invention. For example, the correlation engine may be aware that a particular file has a certain classification. When data is written to that file or to a file with that classification, the trigger may be generated. Other actions may also be performed, such as blocking the event based on the detected event, based on the event and previously detected events in the same session or for the same file/resource.

In operation, the filter driver and user space executable (correlation engine) may be installed on a machine such as a server. The filter driver then sends file system events (IO requests, primitives) to the correlation engine, which maintains a session or session state for each file or resource in use.

When a session is complete, the session cache may serialize the session data and transmit the data to an endpoint that may be configured to process the session data as previously described. The endpoint may load the session data into the relevant storage.

Figure 6:
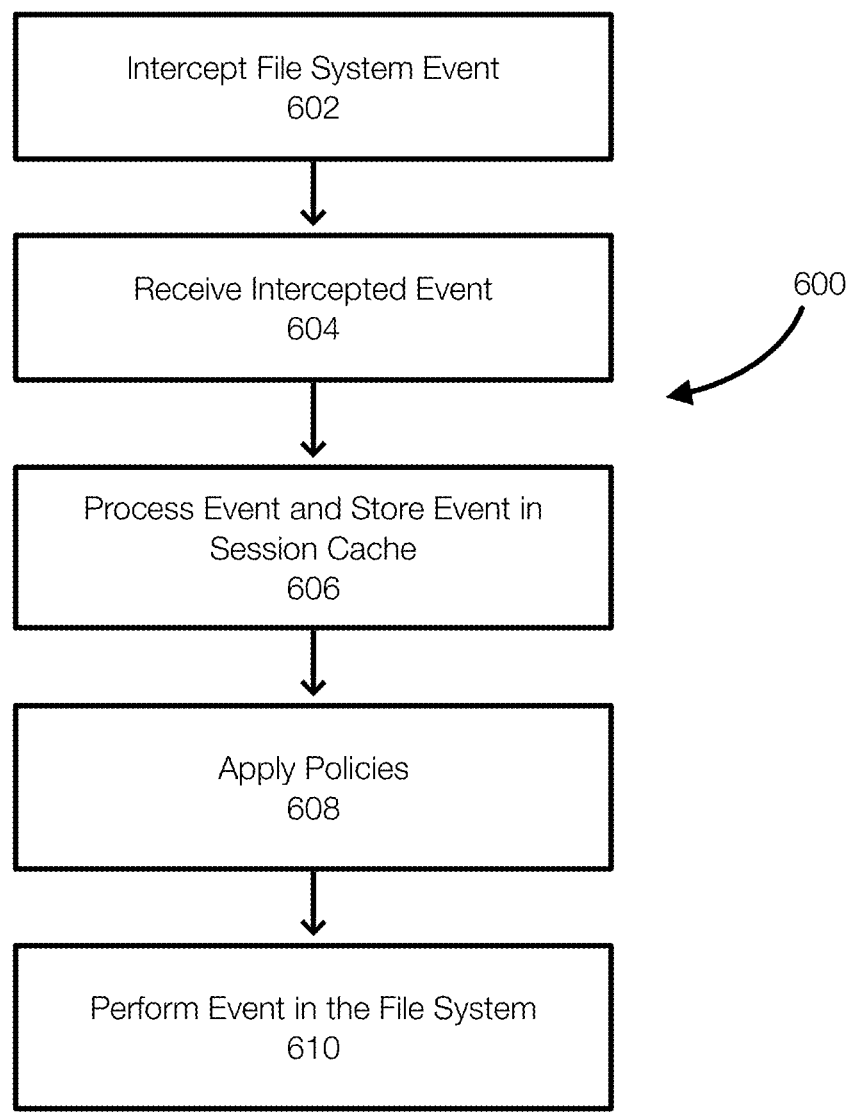
FIG. 6 discloses aspects of a method for correlating events in a file system.

FIG. 6 discloses aspects of a method for correlating filesystem events into meaningful behaviors. In one example, a file system event is intercepted 602. This typically occurs in the kernel space and may involve file system primitives.

The intercepted event is received 604 into the user space at a correlation engine. The correlation engine processes 606 the event and stores the event in a session cache. Processing the event may include extracting metadata from or associated with the event. The metadata or other information associated with the event are stored in the session cache and are associated with a session for that file. This may include creating a new session if the file or resource associated with the event was not previously in use. If the file or resource is in use, the corresponding session is updated with a new entry.

In one example, policies may be applied 608. The policies may be applied before certain actions are performed. For example, for a write, the policies may be applied before the write is committed to the physical disk. For a read, the policies may be applied before the data is returned to the requesting process/user.

This allows the correlation engine (or other engine, which may be external) to evaluate the event with a larger context of events. This may allow the event to be blocked or modified, allow a notification to be generated, or the like.

Once policies have been applied, which may be optional, the event is performed 610 in the file system. If policies are not being applied or for other reasons, the operation of the event in the kernel space may continue independently of the operation of the correlation engine in the user space. In one example, even if policies are not applied, the event does not pass the filter driver until processing in the user space is complete and acknowledged to the filter driver.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, engines, modules, and components, that individually and/or collectively implement, and/or cause the implementation of, operations which may include, but are not limited to, correlation operations and related operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client or engine may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, containers, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: intercepting an event at a filter driver, wherein the event is associated with a resource of a computing system, identifying metadata associated with the event by a correlating engine, storing, by the correlating engine, the metadata and/or data associated with the event in a session associated with the resource, wherein the session is included in a session cache, and performing the event in the computing system.

Embodiment 2. The method of embodiment 1, further comprising intercepting the event in a kernel space and providing the event to a correlating engine operating in a user space, wherein the correlating engine includes the session cache.

Embodiment 3. The method of embodiment 1 and/or 2, further comprising determining that the session has ended and generating a logical timeline based on entries included in the session, wherein each of the entries corresponds to an event.

Embodiment 4. The method of embodiment 1, 2, and/or 3, wherein the logical timeline includes a time ordered list of events related to the resource in a graph form, a time series form, a table form, or a relational database form.

Embodiment 5. The method of embodiment 1, 2, 3, and/or 4, further comprising storing the logical timeline in a data store such that logical timelines stored in the data store can be queried.

Embodiment 6. The method of embodiment 1, 2, 3, 4, and/or 5, further comprising extracting the metadata, wherein the metadata includes a session identifier, a handle, an identity of a user, process metadata including process ID, executable name, resource location, and application name, and timestamps.

Embodiment 7. The method of embodiment 1, 2, 3, 4, 5, and/or 6, wherein the resource comprises a file, a bucket, a directory tree, an object, or combination thereof.

Embodiment 8. The method of embodiment 1, 2, 3, 4, 5, 6, and/or 7, further comprising applying a policy to the event based on the event and/or other entries in the session associated with the resource.

Embodiment 9. The method of embodiment 1, 2, 3, 4, 5, 6, 7, and/or 8, further comprising stopping the event, altering data associated with the event, generating notifications based on the event and/or other events related to the resource.

Embodiment 10. The method of embodiment 1, 2, 3, 4, 5, 6, 7, 8, and/or 9, further comprising operating the correlating engine in a user space, wherein the correlating engine includes the session cache, a filter driver proxy configured to receive the event from the filter driver, and an implementation engine configured to process the event for storing in the session cache.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' or 'computing system' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
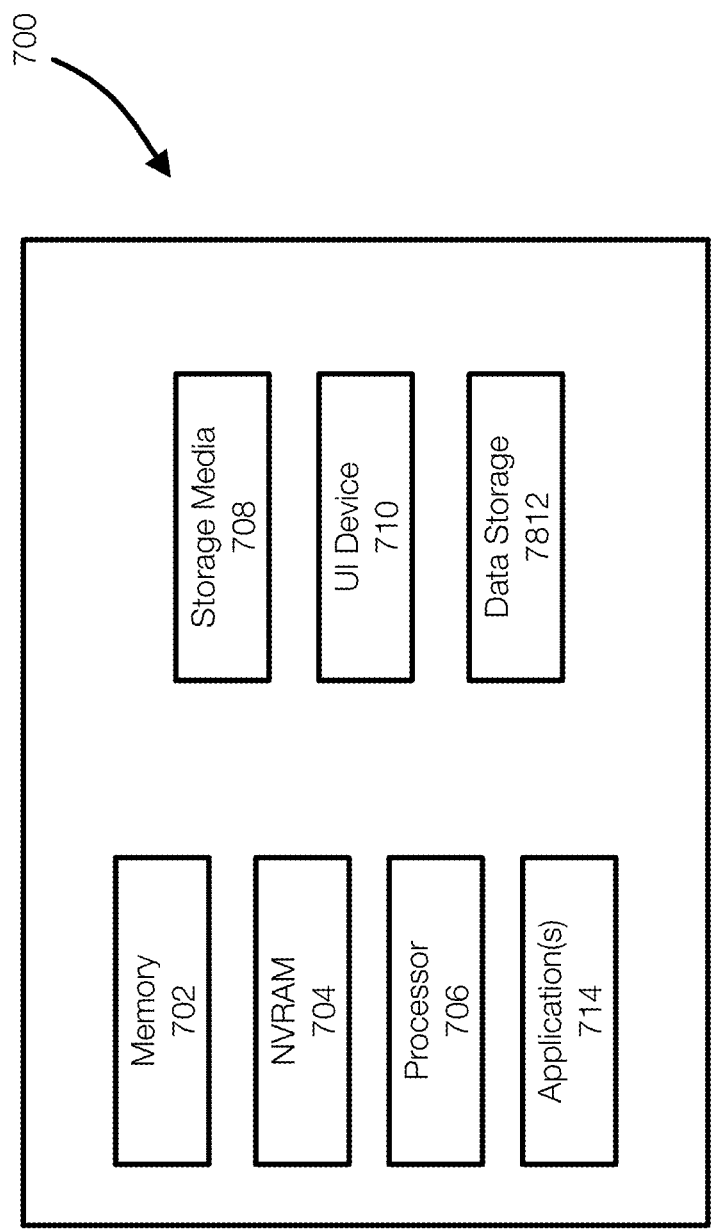
FIG. 7 discloses aspects of a computing environment.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   intercepting an event at a filter driver, wherein the event is associated with a resource of a computing system;
   identifying metadata associated with the event by a correlating engine, wherein the correlating engine resides at a user space and not at a kernel space;
   storing, by the correlating engine, the metadata associated with the event in a session associated with the resource, wherein the session is included in a session cache of the correlating engine;
   performing the event in the computing system;
   generating a logical timeline of the session that includes information for each entry in the session; and
   determining that a subsequent event causes the session to be finalized,
   wherein, when it is determined that the session is to be finalized based on the subsequent event, entries in the session are exported from the session cache to a data store external to the correlating engine.

2. The method of claim 1, further comprising intercepting the event in a kernel space and providing the event to the correlating engine operating in a user space, wherein the correlating engine includes the session cache.

3. The method of claim 1, wherein each of the entries corresponds to a respective event.

4. The method of claim 3, wherein the logical timeline includes a time ordered list of events related to the resource in a graph form, a time series form, a table form, or a relational database form.

5. The method of claim 4, further comprising storing the logical timeline in the data store such that logical timelines stored in the data store can be queried.

6. The method of claim 1, further comprising extracting the metadata, wherein the metadata includes a session identifier, a handle, an identity of a user, process metadata including process ID, executable name, resource location, and application name, and timestamps.

7. The method of claim 1, wherein the resource comprises a file, a bucket, a directory tree, or an object.

8. The method of claim 1, further comprising applying a policy to the event based on the event and/or entries in the session associated with the resource.

9. The method of claim 8, further comprising stopping the event, altering data associated with the event, generating notifications based on the event and/or other events related to the resource.

10. The method of claim 1, further comprising operating the correlating engine in a user space, wherein the correlating engine includes the session cache, a filter driver proxy configured to receive the event from the filter driver, and an implementation engine configured to process the event for storing in the session cache.

11. A non-transitory storage medium having stored therein instructions that are executable by one or more hardware processors to perform operations comprising:
   intercepting an event at a filter driver, wherein the event is associated with a resource of a computing system;
   identifying metadata associated with the event by a correlating engine, wherein the correlating engine resides at a user space and not at a kernel space;
   storing, by the correlating engine, the metadata associated with the event in a session associated with the resource, wherein the session is included in a session cache of the correlating engine;
   performing the event in the computing system;
   generating a logical timeline of the session that includes information for each entry in the session; and
   determining that a subsequent event causes the session to be finalized,
   wherein, when it is determined that the session is to be finalized based on the subsequent event, entries in the session are exported from the session cache to a data store external to the correlating engine.

12. The non-transitory storage medium of claim 11, further comprising intercepting the event in a kernel space and providing the event to the correlating engine operating in a user space, wherein the correlating engine includes the session cache.

13. The non-transitory storage medium of claim 11, wherein each of the entries corresponds to a respective event.

14. The non-transitory storage medium of claim 13, wherein the logical timeline includes a time ordered list of events related to the resource in a graph form, a time series form, a table form, or a relational database form.

15. The non-transitory storage medium of claim 14, further comprising storing the logical timeline in the data store such that logical timelines stored in the data store can be queried.

16. The non-transitory storage medium of claim 11, further comprising extracting the metadata, wherein the metadata includes a session identifier, a handle, an identity of a user, process metadata including process ID, executable name, resource location, and application name, and timestamps.

17. The non-transitory storage medium of claim 11, wherein the resource comprises a file, a bucket, a directory tree, or an object.

18. The non-transitory storage medium of claim 11, further comprising applying a policy to the event based on the event and/or entries in the session associated with the resource.

19. The non-transitory storage medium of claim 18, further comprising stopping the event, altering data associated with the event, generating notifications based on the event and/or other events related to the resource.

20. The non-transitory storage medium of claim 11, further comprising operating the correlating engine in a user space, wherein the correlating engine includes the session cache, a filter driver proxy configured to receive the event from the filter driver, and an implementation engine configured to process the event for storing in the session cache.

* * * * *